United States Patent [19]

Schlapp

[11] Patent Number: 4,813,737
[45] Date of Patent: Mar. 21, 1989

[54] LID LINER FOR THE RIGID LID OF A SLIDING-LIFTING ROOF FOR AUTOMOBILES

[75] Inventor: Albert Schlapp, Dreieich, Fed. Rep. of Germany

[73] Assignee: Rockwell-Golde GmbH, Fed. Rep. of Germany

[21] Appl. No.: 168,018

[22] Filed: Mar. 14, 1988

[30] Foreign Application Priority Data

Mar. 17, 1987 [DE] Fed. Rep. of Germany ... 8703996[U]

[51] Int. Cl.⁴ .............................................. B60J 7/05
[52] U.S. Cl. ..................................... 296/214; 296/221
[58] Field of Search .............. 296/211, 214, 216, 220, 296/221, 222, 223; 49/67, 62, 63

[56] References Cited

U.S. PATENT DOCUMENTS

| | | | |
|---|---|---|---|
| 3,960,404 | 6/1976 | Bienert | 296/221 X |
| 4,390,203 | 6/1983 | Lutz et al. | 296/214 X |
| 4,587,880 | 5/1986 | Sprafke | 296/216 X |
| 4,616,456 | 10/1986 | Parker | 296/216 X |

FOREIGN PATENT DOCUMENTS

| | | | |
|---|---|---|---|
| 105294 | 3/1957 | Denmark | 49/67 |
| 24229 | 3/1956 | Fed. Rep. of Germany | 296/216 |
| 2648664 | 5/1978 | Fed. Rep. of Germany | 296/221 |
| 8107603 | 10/1981 | Fed. Rep. of Germany | 296/221 |
| 3442652 | 6/1986 | Fed. Rep. of Germany | 296/222 |
| 551956 | 4/1923 | France | 296/216 |
| 1382824 | 11/1964 | France | 296/214 |
| 2094723 | 9/1982 | United Kingdom | 296/221 |

Primary Examiner—Dennis H. Pedder

[57] ABSTRACT

A lid liner for a rigid lid of a sliding-lifting roof for an automobile includes a liner plate having a ventilation opening closed by a ventilation flap. The ventilation flap in its closed position lies flush at its lower with the lower face of the liner plate and possesses at its periphery a downwardly facing bearing surface, opposite to which there is a corresponding, upwardly facing counter-surface around the periphery of the ventilation opening. The two surfaces bear against each other without a gap in the closed position, thereby serving to enhance the appearance of the interior of the vehicle and to suppress the penetration of travel noise through the ventilation when closed by the ventilation flap.

3 Claims, 3 Drawing Sheets

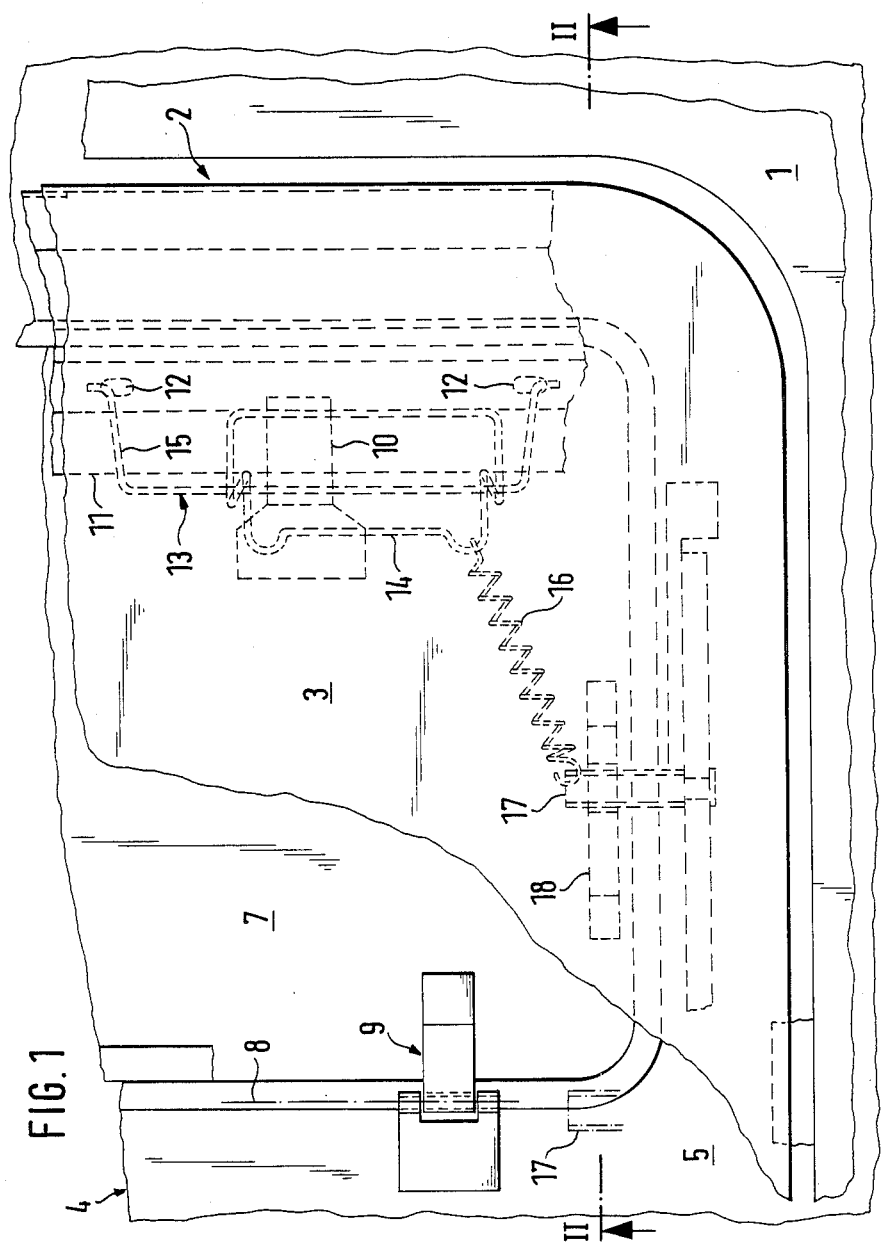

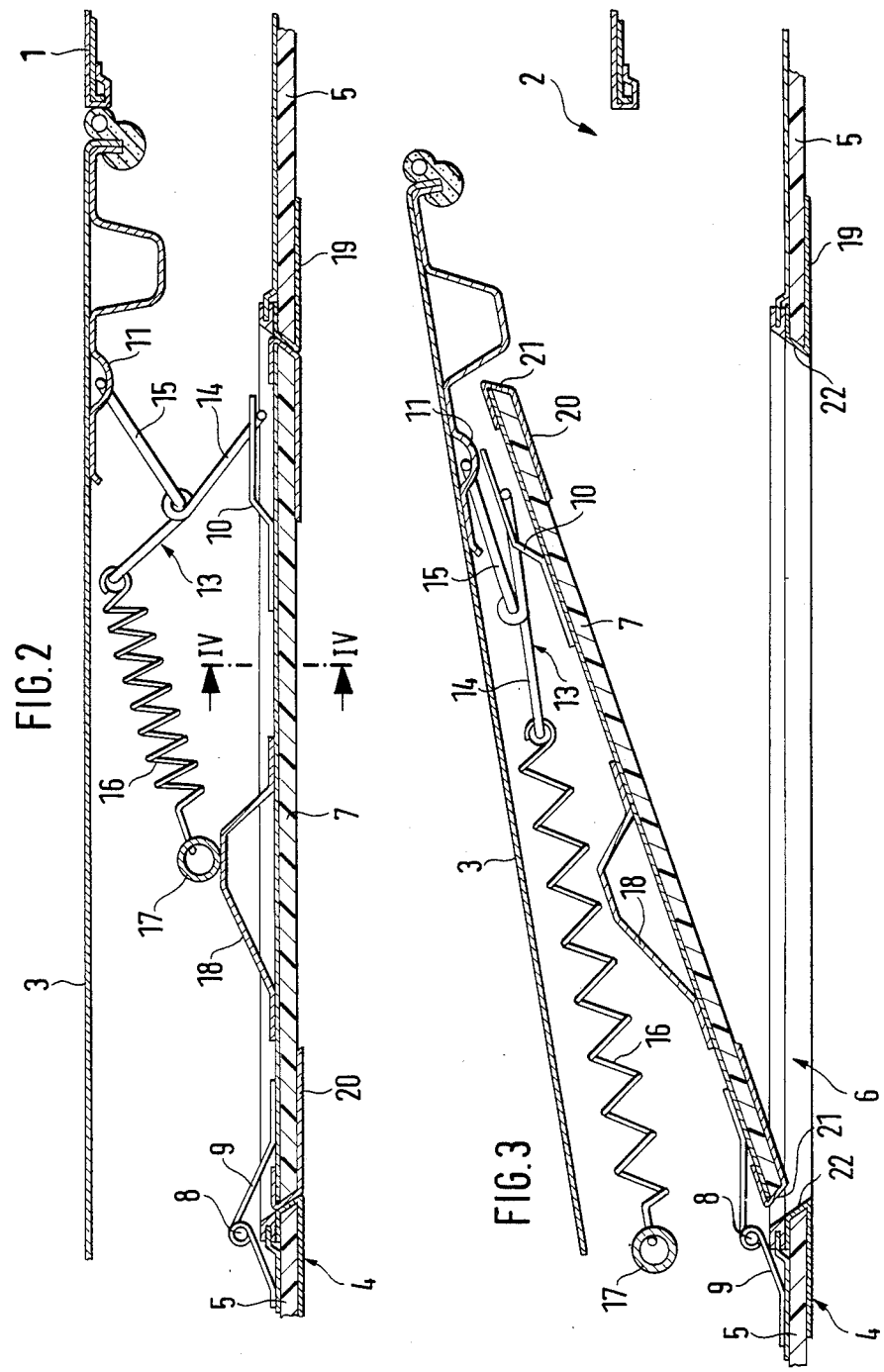

LID LINER FOR THE RIGID LID OF A SLIDING-LIFTING ROOF FOR AUTOMOBILES

FIELD OF THE INVENTION

This invention relates to a lid liner for the rigid lid of a sliding-lifting roof for automobiles.

DESCRIPTION OF PRIOR ART

Such a lid liner is known, which consists of a liner plate having a ventilation opening provided in a rear region thereof and of a ventilation flap which closes the ventilation opening in the closed and sliding positions of the lid. The flap is connected pivotally at its forward edge with the liner plate about an axis extending transversely to the direction of sliding of the liner plate, and the pivoting movements of which are controlled by the lid in the pivoting-out and pivoting-in movements of the lid.

In one known lid liner of this type (DE-AS No. 26 48 664), the ventilation flap rests from above upon the liner plate, and the ventilation opening is also equipped advantageously with an upwardly orientated rim, upon which the ventilation flap bears in a plane generally parallel to the plane of the liner plate, provided that the ventilation flap is not pivoted out. By this arrangement, it is intended that sharp edges that could cause accidents are avoided in the region of the ventilation opening.

The known lid liner is, however, accompanied by the disadvantage that the vehicle liner exhibits three surfaces that are visibly stepped from one another. Firstly, the surface of the lid liner is already in a second plane stepped above the lining fabric or vehicle liner extending continuously from the windscreen to the rear window of the automobile. This step-back of the lid liner is unavoidable in the majority of sliding roof constructions. Secondly, in the case of the aforementioned, known lid liner, a third liner plane is now present within the plane of the lid liner in the region of the ventilation opening, this third plane being formed by the surface, visible from below, of the closed ventilation flap. This third, upwardly-stepped plane in particular gives the vehicle roof liner an undesirable cracked appearance.

It is further regarded as a disadvantage that, due to the ventilation flap bearing from above upon the liner plate, sealing problems arise in particular against the entry of noise. The liner plate and, therefore, also the ventilation flap must be domed or curved to follow the contour of the fixed liner. Since, when the rigid lid is closed, the ventilation flap is pressed onto the liner plate only at its lateral edges, the possibility exists that, in the central transverse zone, an inadequate bearing pressure is exerted upon the ventilation flap, with the result that in certain circumstances a gap results, which is detrimental even when its dimensions are small. Running tests have shown that even a slight gap between liner plate and ventilation flap contributes considerably to an increase in the noise level in the interior of the vehicle. The possibility of a gap forming is particularly high in the hinge region, because the distance in height between liner plate and ventilation flap is determined largely by the flanges of the hinges and the bearing pressure exerted laterally upon the ventilation flap is not effective in the region of the hinges.

The above-described disadvantages also apply to a further known apparatus of the type under discussion (DE-GM No. 81 07 603), in which a movement control for the ventilation flap of a different type is provided.

OBJECT OF THE INVENTION

An object therefore of the present invention is to provide a lid liner of the type described in which the ventilation flap no longer appears as a nuisance in the interior of the vehicle and in which the penetration of travel noise through the ventilation opening when closed by the ventilation flap is suppressed.

SUMMARY OF THE INVENTION

According to the present invention, there is provided a lid liner for a rigid lid of a sliding-lifting roof for an automobile, the lid liner including a liner plate having a ventilation opening provided in it and a ventilation flap covering the ventilation opening in closed and sliding positions of the lid, which flap is connected, at one edge thereof, with the liner plate pivotally about an axis extending transversely to the direction of sliding of the liner plate and the pivotal movement of which is controlled by the lid in the pivoting-out and pivoting-in movements of the lid, and the ventilation flap, in its closed position, engaging in the ventilation opening, lying flush at its lower face with the liner plate and possessing, at its periphery, a downwardly facing bearing surface, opposite to which there is a corresponding, upwardly facing counter-surface at the periphery of the ventilation opening, in such a manner that said bearing surface and said counter-surface bear against each other without a gap in the closed position.

In this manner the presence of a gap between the periphery of the ventilation flap and the periphery of the ventilation opening, which could make possible penetration of vehicle noise into the interior in the closed position, is prevented. By the flush position of the lower faces of the liner plate and ventilation flap, the forming of an additional step in the region of the lid liner is avoided.

Preferably, the arrangement is such that the bearing surface is an outwardly and upwardly inclined oblique surface, whereas the counter-surface complementary to it is an inwardly, downwardly inclined oblique surface. By this special construction, the ventilation flap can be pressed from above into the ventilation opening, the bearing surface and counter-surface bearing firmly against each other, but nevertheless lifting immediately off each other without friction when the ventilation flap is pivoted out, with the result that even with slight pivoting-out movements, an effective air gap is obtained. In the closed position, with this preferred form of embodiment, no peripheral gap can be seen from the vehicle interior between the surface of the liner plate and the surface of the ventilation flap, but virtually only a line denoting the outline of the ventilation flap.

In an alternative form, the bearing surface is constructed as a stepped surface, which rests from above on the counter-surface in the closed position. Here again, bearing surface and counter-surface may be so pressed onto each other in the closed position that the edge of the flap bears around its periphery entirely against the edge of the ventilation opening, so that an effective screen against noise is obtained. With this form of embodiment also, even a slight pivotal movement of the ventilation flap results in an effective ventilation gap.

The mutually associated peripheral edges of the ventilation opening and ventilation flap do not need to be constructed throughout as counter-surface and bearing surface respectively, but indeed the arrangement may be such that the bearing surface and the counter-surface each constitute only partly the associated peripheral edge, and that further surfaces, adjoining the bearing surface and the counter-surface, of the peripheral edges of ventilation flap and ventilation opening lie opposite each other in the closed position with a gap between. In spite of the forming of this gap, nevertheless, as a result of the peripheral bearing surface being pressed against the peripheral counter-surface, a screen against noise is obtained. The gap-forming surfaces may be either oblique surfaces inclined in pairs or they are orientated in pairs, generally vertically.

The invention also extends to an automobile incorporating the present lid liner.

BRIEF DESCRIPTION OF THE DRAWINGS

For a better understanding of the invention and to show how the same may be carried into effect, reference will now be made, by way of example, to the accompanying drawings, in which:

FIG. 1 is a plan view of part of a closed sliding-lifting roof with lid liner,

FIG. 2 is a section taken along line II—II in FIG. 1,

FIG. 3 is a section, similar to that shown in FIG. 2, but with the rigid lid pivoted out and the ventilation flap opened.

DESCRIPTION OF THE PREFERRED EMBODIMENTS

Figure 5:
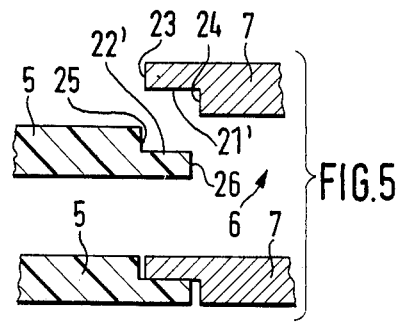

Referring to the drawings, in a fixed roof 1 of an automobile, a roof opening 2 is provided, which can be closed by a rigid lid 3. The rigid lid 3 can be displaced out of the roof opening 2 in the manner usual in sliding-lifting roofs, it being possible for this lid, starting from its closed position illustrated in FIGS. 1 and 2, to be raised into the position shown in FIG. 3 by lifting its rear edge in the manner of front-hinged flaps, or again, starting from its closed position, to be displaced after lowering of its rear edge beneath the rear surface of the fixed roof 1 into a seating chamber provided there. The guide elements and the drive elements which facilitate and cause respectively the aforementioned lid movements do not form part of the subject of this invention and are therefore not further described.

Below the rigid lid 3 there is a lid liner 4 which, in the usual manner, is coupled with the rigid lid 3 and therefore participates in its sliding movements. For this purpose, the lid liner 4 is longitudinally slidably guided on lateral guide rails (not shown).

The lid liner 4 consists of a liner plate 5, in the rear region of which a ventilation opening 6 is provided, and of a ventilation flap 7, which covers the ventilation opening 6 both in the closed position and also in slid positions of the lid 3. The ventilation flap 7 is pivotable about an axis extending transversely to the direction of displacement and located in the vicinity of its front edge. The axis 8 is formed of hinges 9, of which only one can be seen in the drawings, and by means of which the ventilation flap 7 is articulated to the linerplate 5.

The example of lid liner illustrated in the drawings, the ventilation flap of which is connected in the manner illustrated with the lid 3, corresponds to the arrangement given in DE-GM No. 81 07 603. Here, in the vicinity of the rear end of the ventilation flap 7, cranked lugs 10 are fixed, open towards the rear. In the vicinity of the rear end of the rigid lid 3, a lug 11 is fixed, in which there are openings 12. Between the lugs 10 and 11 there are, on either side, a hinge element 13, which in the example illustrated is constructed as a bent wire component and comprises two articulation components 14 and 15. The articulation component 14 is hooked, with its one end, into the lug 10 and, at its other end, engages a tension spring 16, the other end of which is hooked to an entraining device 17. The articulation component 15 is engaged, approximately at the centre of the articulation component 14, the two ends of the component 15 being hooked into the openings 12 of the lug 11.

In the closed position, the ventilation flap 7 and the hinge element 13 are held in the position shown in FIG. 2, in which the tension spring 16 is relaxed. When the rigid lid 3 is raised, the entraining device 17 is brought into the position indicated in FIG. 1 in dot-and-dash lines, causing the entraining device to release a ramp 18, connected with the ventilation flap 7, so that the hinge element is brought into the folded position illustrated in FIG. 3 with stressing of the tension spring 16 and the ramp no longer obstructs the raising of the ventilation flap 7. The rear end of the ventilation flap can now bear firmly against the rigid lid 3.

In the example illustrated in FIGS. 1 to 4, the liner plate 5 and the ventilation flap 7 are composed of two different materials and are covered on their lower surfaces with lining fabric 19, 20 respectively. The lining fabric 19 is conducted around the peripheral edge of the ventilation opening 6. Correspondingly, the lining fabric 20 is conducted around the peripheral edge of the ventilation flap 7.

The ventilation flap 7 is sloped or chamfered on all four sides, so that an outwardly, upwardly inclined oblique surface results, which constitutes a bearing surface 21 continuous through the entire thickness of the ventilation flap 7. Correspondingly, at the peripheral edge of the lid liner 4 forming the boundary to the ventilation opening 6, an inwardly, downwardly facing oblique surface is provided, which forms the counter-surface 22 complementary to the bearing surface 21. As can be seen from FIG. 2, the bearing surface 21 and counter-surface 22 bear against each other without a gap in the closed position and are pressed together by the entraining devices 17 and ramps 18 acting as holding-down devices, the lower surfaces of the liner plate 5 and of the ventilation flap 7 and the corresponding lining fabrics 19 and 20 respectively being flush with one another. As FIG. 3 shows, even slight pivoting movements of the ventilation flap 7 about the axis 8 lead to an immediate lifting of the bearing surface 21 off the counter-surface 22, so that a ventilation gap is immediately produced between these surfaces, this gap being wedge-shaped at front and rear and of uniform but different widths. As a consequence of the position of the axis 8, when the ventilation flap 7 is pivoted outwards, the bearing surface 21 at the forward edge of the ventilation flap 7 also lifts off the counter-surface 22 without friction. In the closed position, the ventilation flap 7 presses into the ventilation opening 6 in form-fitting manner, so that no peripheral gap exists, which could permit penetration of vehicle noise through the roof construction.

For explaining further forms of embodiment relating to the peripheral edges of the ventilation flap and ventilation opening, reference is now made to FIGS. 5 to 10. In FIGS. 5 to 9, the bearing surface 21' at the peripheral edge of the ventilation flap 7 is constructed as a stepped surface, that is to say it extends generally horizontally. This bearing surface 21', in the examples according to FIGS. 5 to 9, bears from above onto a correspondingly orientated counter-surface 22' at the peripheral edge of the ventilation opening 6. The counter-surface 22' may be constituted directly by the upper surface of the liner plate 5, as is the case in the examples according to FIG. 8 and FIG. 9, but it can also be constructed as a stepped surface, as will be seen in FIGS. 5 to 7.

In all the examples shown in FIGS. 5 to 10, the bearing surface and the associated counter-surface constitute only partly the associated peripheral edge of the ventilation flap 7 and ventilation opening 6 respectively. In the example shown in FIG. 5, generally vertically orientated surfaces 23 and 24 adjoin on either side the bearing surface 21'. Correspondingly, likewise generally vertically orientated surfaces 25 and 26 adjoin the counter-surface 22' on either side. In the closed position, on the one hand the surfaces 23 and 25 and on the other hand the surfaces 24 and 26 lie opposite each other in pairs with a gap between, as can be seen from the lower half of FIG. 5. This means that the ventilation flap 7 does not need to be fitted without a gap into the ventilation opening 6, but that nevertheless, due to the illustrated arrangement of the bearing surface 21' and of the counter-surface 22', a gap-free closed position is made possible. The same applies also for the other examples shown in FIGS. 6 to 10.

Figure 6:
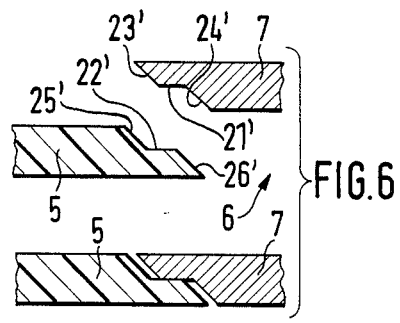
Figure 7:
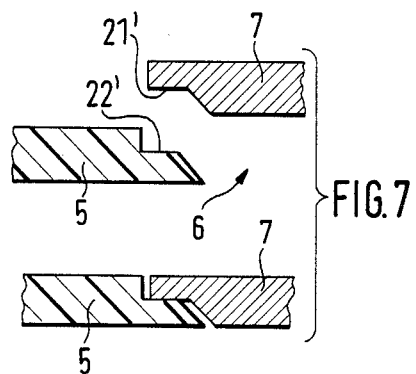
Figure 8:
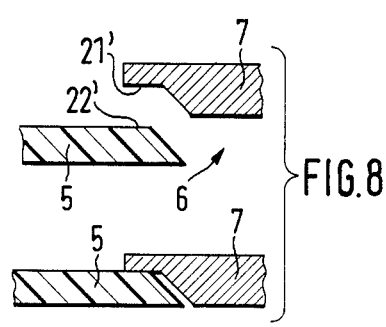
Figure 9:
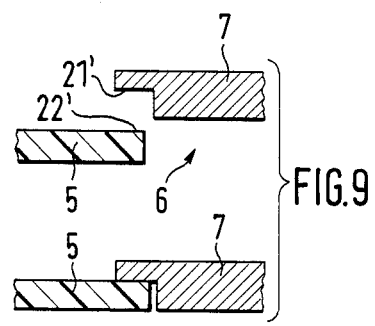

The surfaces laterally adjoining the bearing surface 21' and counter-surface 22' do not need to be orientated vertically in pairs, as has been described with reference to FIG. 5 and as is also the case in FIG. 9 and partly also in FIG. 7, but these surfaces can be gap-forming oblique surfaces, inclined in pairs, as shown in FIGS. 6 and 8 and partly also in FIG. 7. The example shown in FIG. 6 differs from that shown in FIG. 5 only in that the gap forming surfaces 23', 25' and 24', 26', opposite each other in pairs, are inclined surfaces having the same direction of slope.

Figure 10:
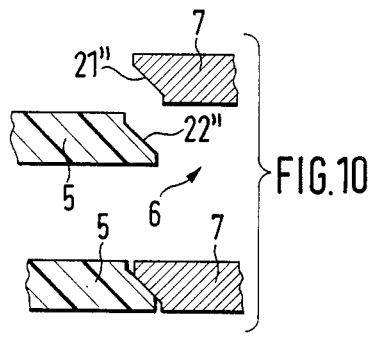
Figure 4:
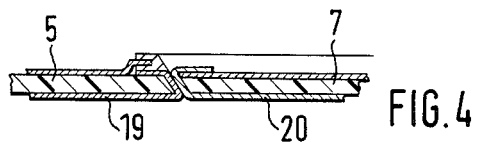
FIG. 4 is a section through the edge regions of the ventilation opening and of the ventilation flap taken along line IV—IV in FIG. 2, and FIGS. 5 to 10 are schematic sectional views similar to FIG. 4 through differently constructed peripheral edges of the ventilation opening and of the ventilation flap, an upper view in each case showing the peripheral edges lifted off each other and a lower view in each case showing the peripheral edges bearing against each other.

The example shown in FIG. 10 represents a variant of the embodiment shown in FIGS. 1 to 4. Here, the bearing surface 21'' and counter-surface 22'' are also inclined oblique surfaces, but in this case they do not constitute the entire area of the relevant peripheral edge, but only its central zone. On either side of the bearing surface 21'' and of the counter-surface 22'', there adjoin vertical surfaces, not referenced here, which in the closed position constitute an upper and a lower gap in pairs.

I claim:

1. In a sliding-lifting roof for an automobile having a roof opening, a rigid lid, a lid liner for said rigid lid, a lid liner plate, a ventilation opening in said liner plate and a substantially rectangular ventilation flap which is pivotally connected at its forward edge to said liner plate, said ventilation flap covering said ventilation opening in closed and sliding positions of said lid, the pivoting movement of said liner plate being about a pivot axis extending transversely to the direction of sliding of said liner plate and said pivotal movement being controlled by said rigid lid to thereby control the pivoting movement of said ventilation flap, articulation elements connected adjacent a rear end of said ventilation flap and connected adjacent a rear end of the rigid lid; said articulation elements including a hinge adapted to move said ventilation flap upwardly, that improvement comprising: the ventilation flap having an outwardly and upwardly sloping edge surface on all four sides thereof; adjoining edges of said lid liner being formed with an inwardly and downwardly sloping edge surface complementary to the edge surface of said ventilation liner whereby the edge surface of said ventilation liner lies against the edge surface of said lid liner with the ventilation flap in the closed position and a lower surface of the lid liner lies in the same plane with a lower surface of said ventilation flap; and said pivot axis comprising means for lifting and supporting said ventilation flap with said respective edge surfaces of said flap and liner at said forward edge being spaced apart.

2. A sliding-lifting roof as claimed in claim 1 wherein said edge surface of said ventilation flap terminates at a location between said lower surface of said flap and an upper surface of said flap.

3. A sliding lifting roof as claimed in claim 1 wherein a horizontal mating surface separates a lower edge surface and an upper edge surface at a flap edge, both said lower and upper edge surfaces being parallel.

* * * * *